United States Patent
Wannenmacher et al.

(10) Patent No.: US 6,178,447 B1
(45) Date of Patent: Jan. 23, 2001

(54) TELECOMMUNICATIONS NETWORK RECEIVER

(75) Inventors: Stefan Wannenmacher, Ostelsheim; Dieter Beller, Korntal-Münchingen, both of (DE)

(73) Assignee: Alcatel, Paris (FR)

( * ) Notice: Under 35 U.S.C. 154(b), the term of this patent shall be extended for 0 days.

(21) Appl. No.: 09/353,356

(22) Filed: Jul. 15, 1999

(30) Foreign Application Priority Data

Jul. 16, 1998 (DE) .............................................. 198 31 942

(51) Int. Cl.[7] .............................. G06F 15/16; H04N 7/10; H04B 1/38; H04B 7/00; H04H 1/02
(52) U.S. Cl. ............................ 709/219; 348/10; 375/222; 455/6.2; 455/38.3; 455/343
(58) Field of Search ..................................... 455/343, 38.3, 455/574, 6.2, 6.3; 375/222; 348/10; 709/217–219

(56) References Cited

U.S. PATENT DOCUMENTS

| | | | |
|---|---|---|---|
| 5,636,243 | * 6/1997 | Tanaka .................................. | 375/219 |
| 5,758,278 | * 5/1998 | Lansdowne .......................... | 455/343 |
| 5,764,734 | * 6/1998 | Medendorp et al. ............. | 379/90.01 |
| 5,794,137 | * 8/1998 | Harte .................................... | 455/343 |
| 5,815,205 | * 9/1998 | Hashimoto et al. ................ | 348/373 |
| 5,909,559 | * 6/1999 | So ........................................ | 395/307 |
| 5,917,854 | * 6/1999 | Taylor et al. ........................ | 375/222 |
| 5,920,269 | * 7/1999 | Muramatsu ..................... | 340/825.34 |
| 5,978,665 | * 11/1999 | Kim .................................. | 455/249.1 |

FOREIGN PATENT DOCUMENTS

| | | |
|---|---|---|
| 586 490 | 3/1997 | (CH) . |
| 42 17 857 A1 | 12/1993 | (DE) . |
| 195 12 204 A1 | 8/1995 | (DE) . |
| 44 17 780 C2 | 3/1996 | (DE) . |
| 196 04 503 A1 | 8/1997 | (DE) . |
| 0 350 844 A2 | 1/1990 | (EP) . |
| 0 601 539 A2 | 6/1994 | (EP) . |
| 0 668 706 A2 | 8/1995 | (EP) . |
| WO 97/27550 | 7/1997 | (WO) . |

OTHER PUBLICATIONS

"Das IVOD–Projekt Berlin: Anschlusstechnologie zur Bereitstellung von Diensten" R. Heidemann, Alcatel Telecom Rundschau—3$^{rd}$ Quarter 1996, pp. 196–200.

* cited by examiner

*Primary Examiner*—John W. Miller
(74) *Attorney, Agent, or Firm*—Sughrue, Mion, Zinn, Macpeak & Seas, PLLC

(57) ABSTRACT

The receiver (EMP) according to the invention is characterized, in particular, in that it comprises a control unit (CTRL) by means of which the power consumption of individual modules (1', 2', 3', 4', 5', 6', 7', 8') of the receiver (EMP) is reduced as required or can be adjusted to a specified value. In a power-saving mode, only certain modules (1', 2', 3', 4', 5', 6', 7', 8') of the receiver (EMP) which are necessary for detecting a specified identifier are supplied with power only for certain time intervals in order to monitor the received data stream in said time intervals. If the receiver (EMP) detects a specified identifier in a specified segment, it switches to normal operation in order also to supply the remaining modules with power and to receive receiver-specific data. In the time intervals between the specified time intervals, all the modules (1', 2', 3', 4', 5', 6', 7', 8') are, for example, without operating voltage in the power-saving mode.

18 Claims, 4 Drawing Sheets

Fig. 5

TELECOMMUNICATIONS NETWORK RECEIVER

BACKGROUND OF THE INVENTION

The invention relates to a telecommunications network receiver of a telecommunications network in which a stream of receiver-specific data is transmitted from a transmitter to a plurality of receivers.

In the company journal Alcatel Telecom Rundschau, 3rd quarter of 1996, a telecommunications network is described on pages 196 to 200. The telecommunications network is constructed as a hybrid glass-fibre/coaxial-cable network and serves to transmit analog television signals and digital signals, for example for telephony, video-on-demand, pay-per-channel, tele-learning etc. From a transmitter, a so-called server or a so-called head station, the digital signals are transmitted via a distribution network comprising optical glass-fibre lines and distribution networks connected thereto comprising coaxial cables to a multiplicity of receivers. So-called set-top boxes, for example, are used as receivers. The digital signals are transmitted, for example, in the MPEG format (MPEG=Motion Picture Expert Group).

The receivers are fed, for example, by means of a remote feed via the telecommunications network or via a separate power supply line independent of the telecommunications network. As a rule, an emergency power supply is provided, at least to feed at least one telephone per receiver. The emergency power is supplied, for example, by means of a battery. In particular, in the case of the emergency power supply, and also in the case of the remote supply, only a limited capacity is available per receiver.

SUMMARY OF THE INVENTION

The object of the invention is therefore to minimize the power consumption in the receivers.

The object is achieved by a receiver which is characterized, in particular, in that it comprises a control unit by means of which the power consumption of individual modules of the receiver can be reduced as required or can be set to a specified value, for example the operating voltage for individual modules is switched on or switched off as required and the clock supply of individual modules is switched off or switched on to control their power consumption or the clock speed is reduced or accelerated. In a power-saving mode, for example, only certain modules of the receiver which are necessary to detect a specified identifier are supplied with power only for certain time intervals in order to monitor the received data stream in said time intervals. If the receiver detects a specified identifier in a specified segment, it switches to normal operation in order to supply also the remaining modules with power and to receive receiver-specific data. In the time intervals between the specified time intervals, all the modules, for example, are without operating voltage in the power-saving mode. The current supply and/or voltage supply is consequently modified for individual modules as a function of time and the received signals in such a way that the receiver operates with minimum power consumption at points in time at which no relevant data for the receiver are being transmitted and receives the necessary power required for a satisfactory operating mode at points in time at which relevant data for the receiver are being transmitted.

As a rule, the time intervals in which a receiver receives data relevant to it are shorter than the time intervals in which it does not receive any relevant data. This means that, in the latter time intervals, the power consumption is reduced by a multiple compared with an uninterrupted standby state because of the power-saving mode.

Advantageous refinements of the invention will be apparent from the description below and the appended claims.

BRIEF DESCRIPTION OF THE DRAWINGS

An exemplary embodiment of the invention is described below by reference to FIGS. 1 to 7. In the figures:

FIG. 5 shows a further segment of a data stream.

DETAILED DESCRIPTION OF THE INVENTION

Figure 1:
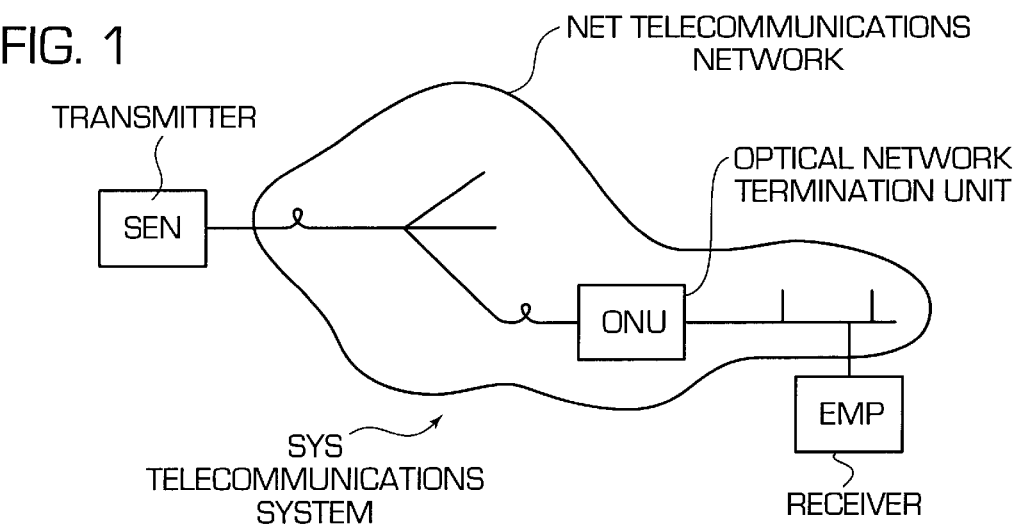
FIG. 1 shows a diagrammatic view of a telecommunications system.

The exemplary embodiment is first described by reference to FIG. 1. FIG. 1 shows a telecommunications system SYS. The telecommunications system SYS comprises at least one transmitter SEN, only one of which is shown for reasons of clarity, a multiplicity of receivers EMP, of which only one is likewise shown for reasons of clarity, and a telecommunications network NET. A data stream comprising receiver-specific data, for example from the fields of video telephony, Internet, video-on-demand, etc. is transmitted by a transmitter SEN, which is designed, for example, as server, via the telecommunications network NET, which is designed, for example, as distribution network with return channel, to all the receivers EMP, which are designed, for example, as set-top boxes or cable modems.

The telecommunications network is designed, for example, as a hybrid fibre/coaxial-cable network. The transmitter SEN is connected by means of an optical glass-fibre line via at least one optical splitter and further optical glass-fibre lines to a multiplicity of optical network termination units ONU, only one of which is likewise shown for reasons of clarity. Each optical network termination unit ONU is connected in turn via coaxial cables to a multiplicity of receivers EMP.

Figure 2:
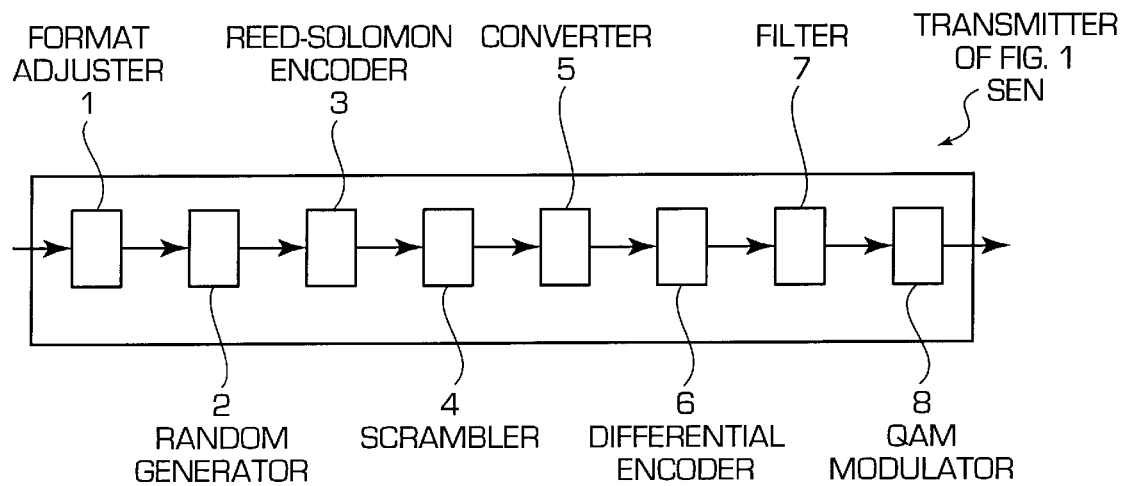
FIG. 2 shows a diagrammatic view of a transmitter of the telecommunications system from FIG. 1.

The exemplary embodiment is now described further by reference to FIG. 2. FIG. 2 shows a transmitter SEN of the telecommunications system from FIG. 1. The data stream is transmitted, for example, in the MPEG format (MPEG= Motion Picture Expert Group). The transmitter SEN comprises, for example, eight modules 1, 2, 3, 4, 5, 6, 7, 8 which serve to generate a data stream comprising receiver-specific data. Thus, for example, module 1 is provided to adapt the data structure of the data source to the MPEG data format, including synchronization bytes.

Module 2 comprises a random generator in order to modify the output spectrum of the data stream.

Module 3 comprises a Reed-Solomon encoder in order to encode the data stream and to be able to perform a defined error correction at the receiver end.

Module 4 comprises a scrambler in order to disperse adjacent information units (for example, bytes) over a larger region and, consequently, to increase the efficiency of the Reed-Solomon encoding.

Module 5 contains a converter which is intended to subdivide the continuous data stream into m-tuples which can then be, for example, QAM-modulated (QAM=quadrature amplitude modulation).

Module 6 contains an encoder which has the object of performing a differential encoding.

Module 7 comprises a filter for filtering the data stream.

Module 8 comprises a QAM modulator for performing the QAM modulation.

Figure 3:
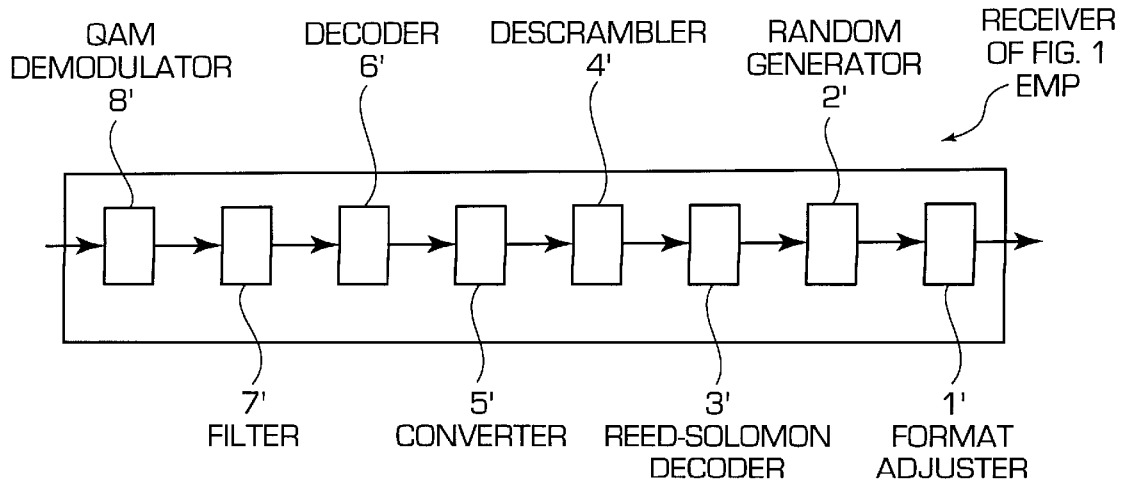
FIG. 3 shows a diagrammatic view of a receiver of the telecommunications system from FIG. 1.

The exemplary embodiment is now described further by reference to FIG. 3. FIG. 3 shows a receiver EMP of the telecommunications system from FIG. 1. The receiver EMP comprises, for example, eight modules 1', 2', 3', 4', 5', 6', 7', 8' which serve to recover receiver-specific data from the data stream generated and transmitted by the transmitter. The modules 1', 2', 3', 4', 5', 6', 7', 8' perform the appropriate inverse data processing.

Module 8' comprises, for this purpose, a QAM demodulator for performing the QAM demodulation.

Module 7' comprises a filter for filtering the data stream.

Module 6' contains a decoder which has the object of performing a differential decoding.

Module 5' comprises a converter which is intended to convert m-tuples into a continuous data stream.

Module 4' comprises a descrambler in order to descramble the data stream.

Module 3' comprises a Reed-Solomon decoder in order to perform a defined error correction.

Module 2' comprises a random generator in order to cancel the modification of the output spectrum of the data stream by module 2.

Module 1' is provided to adjust the MPEG data format, including synchronization bytes, to the data structure of the data sync.

Figure 4:
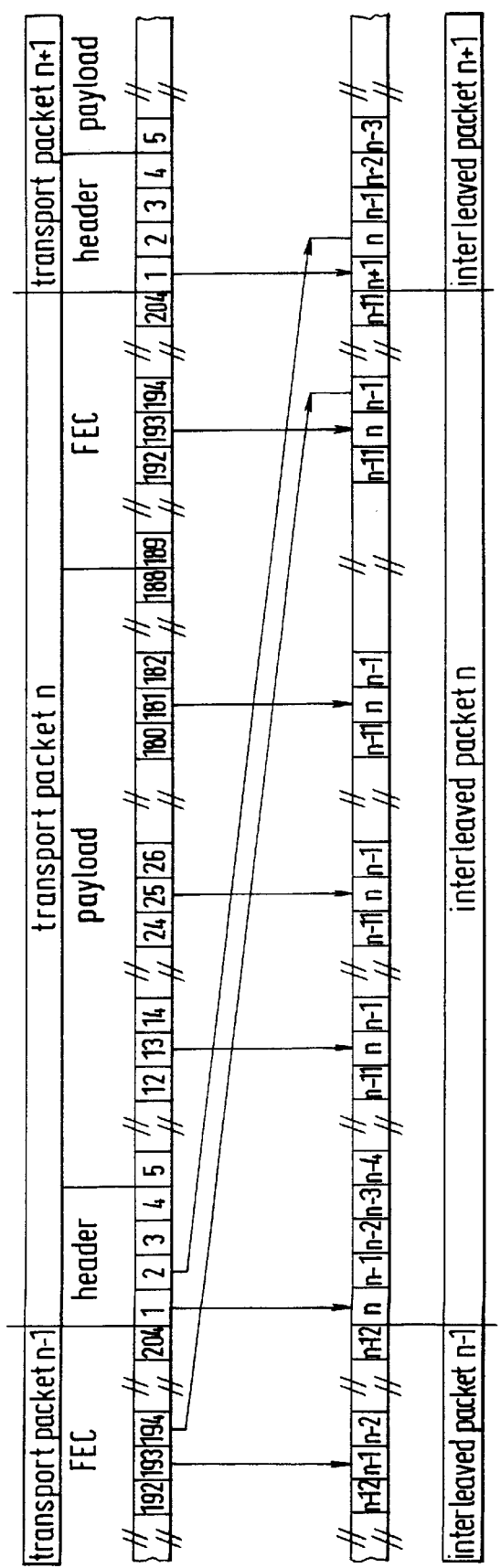
FIG. 4 shows a segment of a data stream.

The exemplary embodiment is now described further by reference to FIG. 4. FIG. 4 shows a segment of a data stream to be transmitted from the transmitter to the receivers. The data stream comprises data packets which each comprise 204 bytes. Each data packet comprises a head section, the so-called header, which comprises, for example, 4 bytes and is provided to transmit items of control information. Each data packet furthermore comprises a so-called payload which comprises 184 bytes and in which receiver-specific useful data are transmitted. Optionally, each data packet comprises 16 bytes which serve for so-called forward error correction. Said data stream is scrambled in module 4, the data of a data packet being divided up into twelve consecutive data packets, as a result of which at least twelve data packets must be received at the receiving end in order to be able to recover the entire information in a given data packet.

Figure 5:
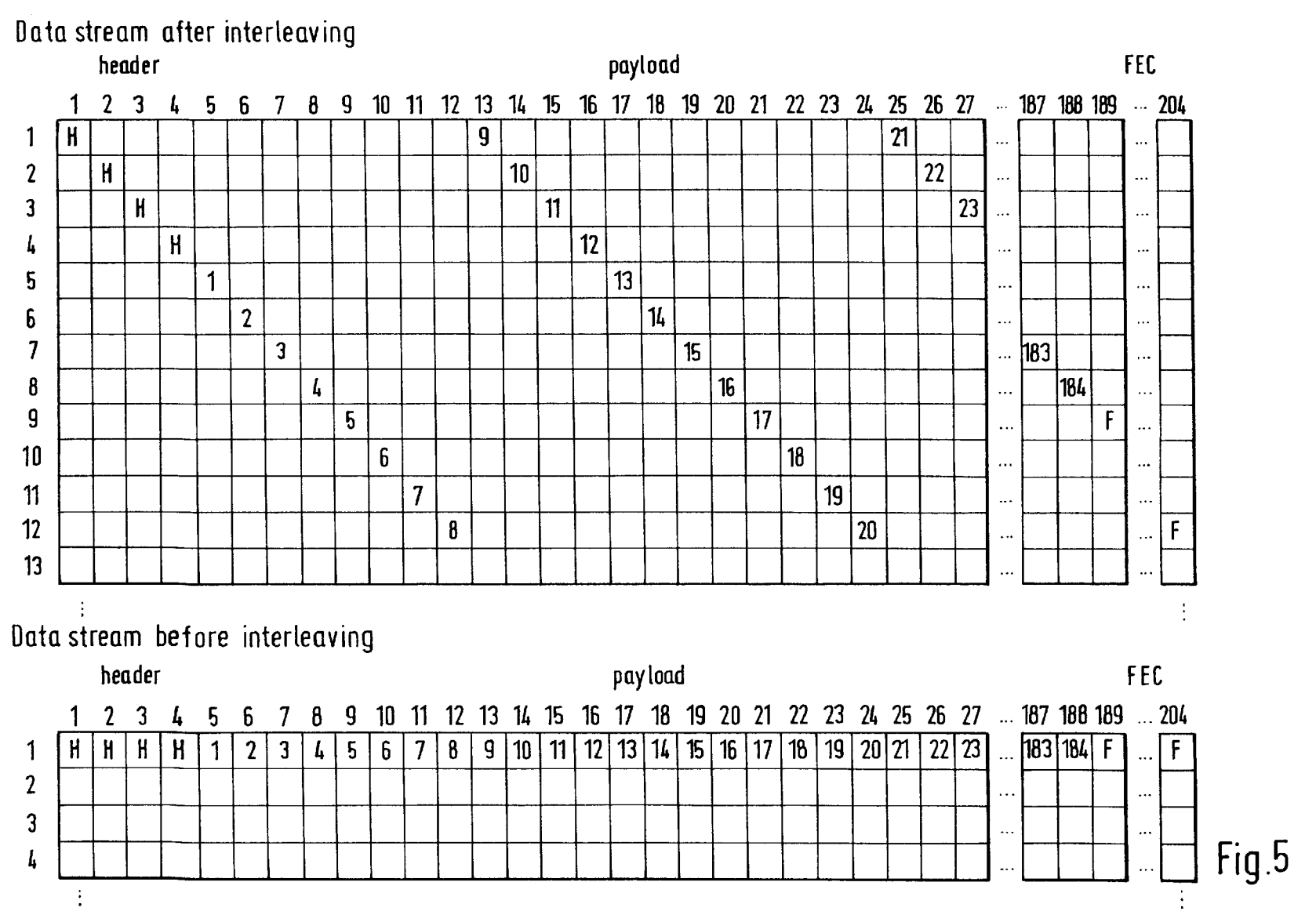

FIG. 5 shows the segment from the data stream from FIG. 4 in enlarged form and clarifies the positioning of the individual bytes associated with a data packet through the graphical representation.

Figure 6:
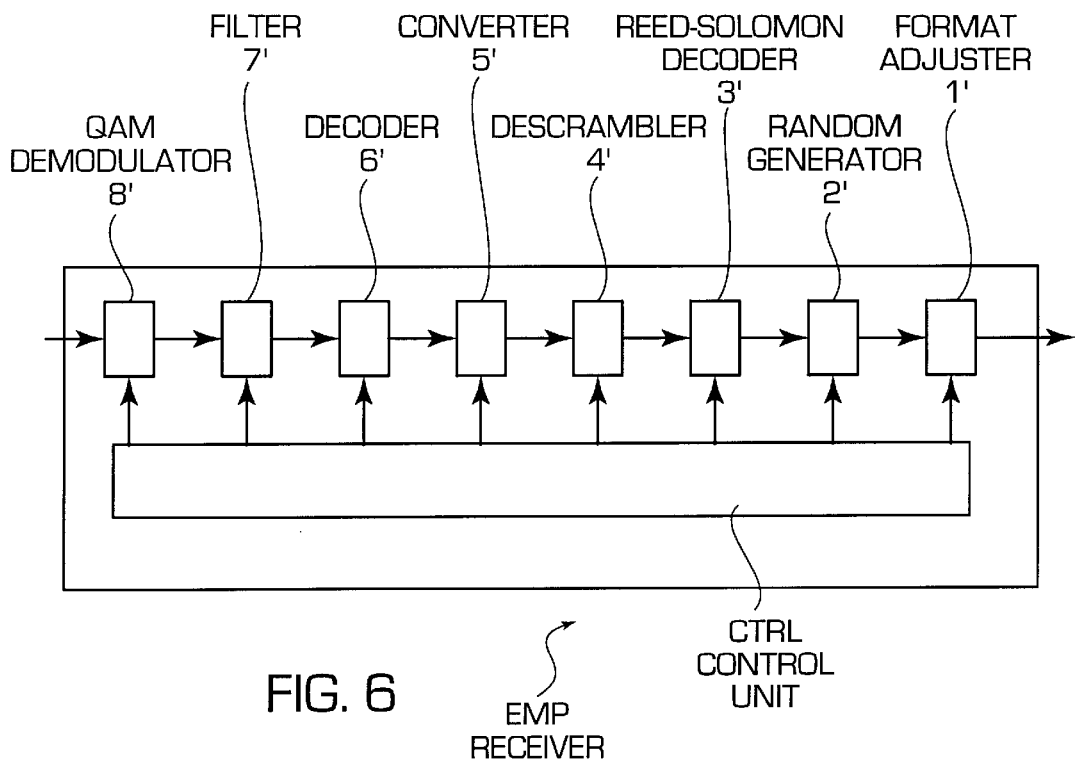
FIG. 6 shows a diagrammatically portrayed structure of a receiver according to the invention.

The exemplary embodiment is now described further by reference to FIG. 6. FIG. 6 shows a receiver EMP according to the invention for use in a telecommunications system from FIG. 1. The receiver EMP comprises the modules 1', 2', 3', 4', 5', 6', 7', 8', known from FIG. 3, for performing the appropriate inverse data processing to recover the data intended for the receiver from the received data stream of a transmitter. In addition, the receiver EMP comprises a control unit CTRL.

The control unit CTRL serves to control the power consumption of the modules 1', 2', 3', 4', 5', 6', 7', 8'. The control unit CTRL is capable of reducing the power consumption of modules 1', 2', 3', 4', 5', 6', 7', 8' in a power-saving mode and for adjusting the power consumption of the modules 2', 3', 4', 5', 6', 7', 8' only in specified time intervals to a specified value in each case in order to monitor sections, received in the specified time intervals, of the received data stream. The control unit CTRL is furthermore capable of adjusting the power consumption of all the modules 1', 2', 3', 4', 5', 6', 7', 8' to a specified value in each case on detecting a specified identifier. The power consumption is controlled, for example, by intermittently switching on and switching off the operating voltage for individual modules of the modules 1', 2', 3', 4', 5', 6', 7', 8'.

The control unit CTRL is designed, for example, as a processor or as a reprogrammable component. A microprocessor or a DSP, for example, may be used as processor (DSP=digital signal processor). An FPGA or a CPLD, for example, may be used as reprogrammable component (FPGA=field-programmable gate array, CPLD=complex programmable logic device). The sequence of switching the operating voltage of the individual modules on and off is implemented by means of software into the control unit CTRL.

In the power-saving mode, for example, the operating voltage of module 1' is switched off during the entire time, even in the time intervals in which the operating voltage of modules 2', 3', 4', 5', 6', 7', 8' is switched on to monitor the received data stream since module 1' is not necessary to detect the identifier. Module 1' performs only a protocol adaptation so that the input data of module 1' already comprises the necessary items of information for detecting the identifier in unencrypted form. The control unit CTRL is therefore connected to the output of module 2'. The output of module 2' is monitored by the control unit CTRL in specified time intervals. On detecting a specified identifier, the control unit CTRL switches on, for example, the operating voltage of all the modules 1', 2', 3', 4', 5', 6', 7', 8' so that the receiver EMP can receive the subsequent receiver-specific data. The receiver then operates in the normal mode.

As in the normal mode, in the power-saving mode, the operating voltage for the synchronization circuit remains, for example, always switched on since the synchronization would temporarily be lost by switching on and off and a resynchronization would require too much time.

The transmitted data stream of a transmitter of the telecommunications system from FIG. 1 comprises data packets which have a head section and a payload containing receiver-specific data. The specific segments to be monitored are contained for each receiver in the data intended for the respective receiver. The receiver-specific data may each be made up of a head section and a payload. In that case, the segments to be monitored may be contained in the head sections of the data intended for the respective receiver. This has the advantage that only the head sections and not the payloads, which are longer in terms of time, would have to be monitored, as a result of which power could again be saved.

A receiver-specific address is assigned to each receiver of the telecommunications system from FIG. 1. The identifier for a specific receiver comprises, for example, the address of the respective receiver. The control unit CTRL of the receiver EMP therefore monitors whether the address of the specific receiver is contained in the data stream at a specified point. If it detects said address, it switches to normal operation and, for that purpose, switches on, for example, the operating voltage of all the modules. Before broadcasting receiver-specific data, the transmitter transmits at a specified point in the data stream the identifier of the specific receiver in order to ensure that the appropriate receiver detects the identifier and switches over from the power-saving mode to the normal mode. Only then is the transmission of the receiver-specific data started. This achieves the result that the respective receiver is operated in the power-saving mode for those intervals of time, which are as a rule long, in which no data is present for the respective receiver and, consequently, only a very small power is needed, namely only in the relatively short time intervals in which it monitors the data stream in order to find out whether its identifier is being transmitted. Alternatively, it is also possible to coordinate between transmitter and receivers points in time at which the identifiers are transmitted and to which receiver. The repeated broadcasting of the identifer can then be dispensed with since the transmitter knows the points in time agreed with the receivers and broadcasts identifiers only at said points in time so that it can be certain that the respective receiver is ready to receive.

The specified time intervals to be monitored by the receiver EMP in the power-saving mode each have, for example, at least the duration of an identifer in order to be able to detect the latter. The time intervals between the specified time intervals have, for example, a duration of 11×12=132 data packets. If, as in the present exemplary embodiment, the transmitter comprises a scrambler which scrambles the data of a data packet so that each receiver requires a descrambler which descrambles the data of the received data packet and, consequently, the entire information of a data packet is available only after receiving twelve data packets, each specified time interval has as a rule to be expanded to twelve data packets. The specified time interval is consequently to be chosen so as to be adapted as minimally as possible to the existing circumstances in order to save as much power as possible. In the present exemplary embodiment, the control unit CTRL is capable of switching on the operating voltage of the descrambler in the specified time intervals in the power-saving mode.

That segment within a data packet in which the identifier is transmitted is specified by the transmitter in coordination with the receivers. As a result of suitable choice of a particularly easily detectable segment, the time interval for monitoring the data packet can be reduced, for example, to one data packet despite scrambling if the appropriate head section is contained only in said segments, whereas the payload is contained in all twelve consecutive data packets.

As already described above, the identifier broadcast by the transmitter may be a specific identifier for each receiver, for example distinguishable by the different addresses of the receivers. This is necessary, for example, if receiver-specific data are transmitted. Receiver-specific data are, for example, telephone signals. Despite its construction as a distribution network with return channel and as a hybrid fibre/coaxial-cable network, the telecommunications system also serves as a telephone network, the so-called cable phone. However, all the data broadcast by the transmitter are fed to all the receivers so that a different identifier is necessary for each receiver. For receiver-independent services, for example software download, an identifier can be used which is identical for all the receivers. The control unit CTRL of the receiver EMP is therefore programmed in such a way that it can detect both the receiver-specific identifier and the identifier which is the same for all receivers.

Figure 7:
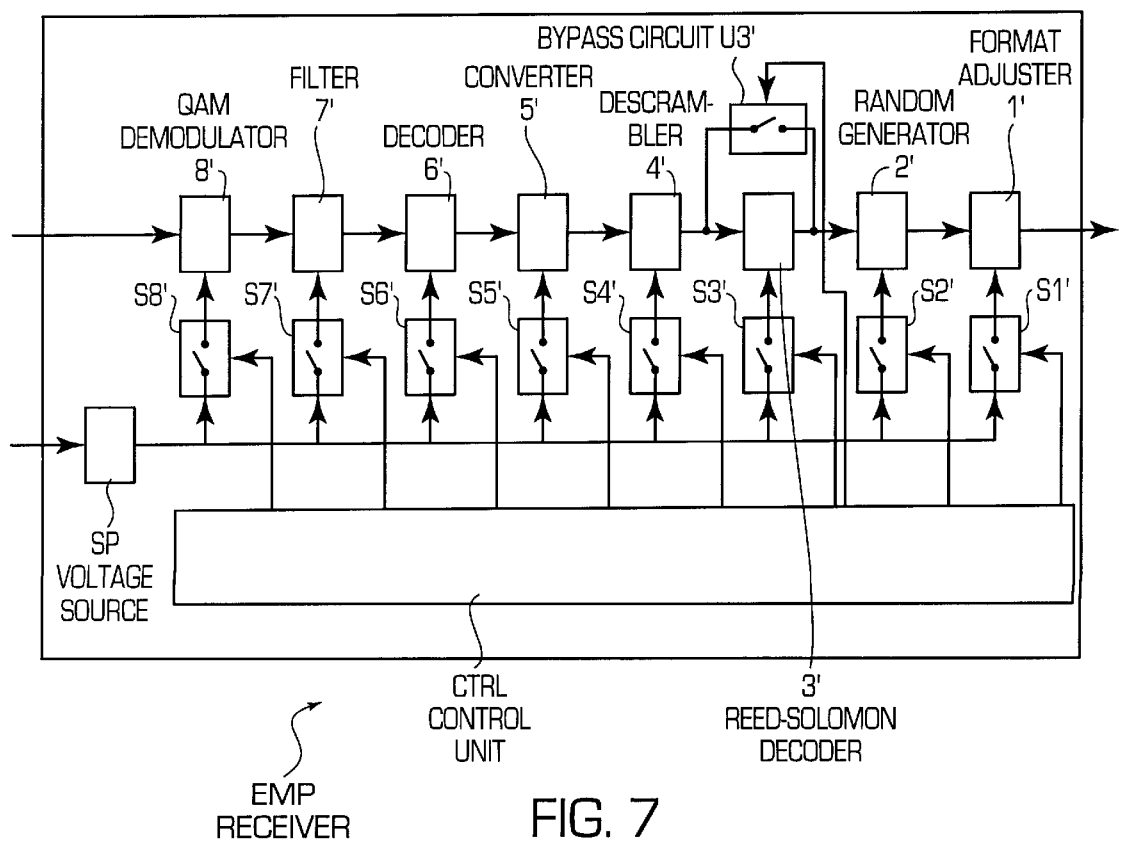
FIG. 7 shows a detailed view of the receiver according to the invention from FIG. 6.

The exemplary embodiment is now described further by reference to FIG. 7. FIG. 7 shows an exemplary embodiment of the receiver according to the invention from FIG. 6.

In addition to the modules described with reference to FIGS. 3 and 6 and to the control unit, the receiver EMP comprises a voltage source SP and eight switches S1', S2', S3', S4', S5', S6', S7', S8'. The voltage source SP is connected to each module 1', 2', 3', 4', 5', 6', 7', 8' by means of a switch S1', S2', S3', S4', S5', S6', S7', S8'. Each switch S1', S2', S3', S4', S5', S6', S7', S8' is activated by the control unit CTRL. Instead of activating each module 1', 2', 3', 4', 5', 6', 7', 8' by means of a separate switch S1', S2', S3', S4', S5', S6', S7', S8', a plurality of modules may also be activated simultaneously by means of one switch. For example, one switch is sufficient to activate modules 2', 4', 5', 6', 7', 8' since said modules are always switched on and off simultaneously. This reduces the number of switches.

The voltage source SP is remotely fed via the telecommunications network or is fed via a separate power supply line which is independent of the telecommunications network. For the emergency power supply, the voltage source SP comprises a battery.

The voltage source SP supplies the power supply for all the modules 1', 2', 3', 4', 5', 6', 7', 8'. The operating voltage is switched on and off separately for each module 1', 2', 3', 4', 5', 6', 7', 8' by the control unit CTRL via the switches S1', S2', S3', S4', S5', S6', S7', S8'. In the normal mode, the operating voltage is switched on for all the modules 1', 2', 3', 4', 5', 6', 7', 8'. In the power-saving mode, the operating voltage is switched off for all the modules 1', 2', 3', 4', 5', 6', 7', 8'; it is only in the specified time intervals that the operating voltage is switched on for modules 2', 3', 4', 5', 6', 7', 8'.

Module 3' is not absolutely necessary for detecting an identifier. It performs a defined error correction according to the Reed-Solomon algorithm. In order to save still more power, the operating voltage of module 3', for example, may therefore also be switched off in the specified time intervals in the power-saving mode. Module 3' comprises, for this purpose, an input and an output and also a switchable bypass circuit U3' which connects input and output. The control unit CTRL is programmed in such a way that it is capable of connecting the input of the module 3' to its output via the switch in the bypass circuit U3' if the operating voltage of the module 3' is switched off. The chain formed by the modules 2', 3', 4' is consequently also not interrupted during the power-saving mode. The control unit CTRL continues to monitor the output of module 2'.

The control unit CTRL is programmed in such a way that it is capable of automatically switching to the power-saving mode after completion of the transmission of the receiver-specific data. As a result, a maximum power reduction is achieved.

The receiver EMP is designed, for example, as MPEG-2 receiver so that it is capable of receiving signals in DVB and/or DAB networks (DVB=digital video broadcasting, DAB=digital audio broadcasting).

What is claimed is:

1. A cable modem of a bidirectional telecommunications network which serves to transmit a data stream from a transmitter to a multiplicity of cable modems, the data stream comprising cable modem-specific data, characterized in that the cable modem comprises:

at least three modules connected in series for recovering the cable-modem-specific data intended for the cable modem from the received data stream; and a control unit for controlling a power consumption of the at least three modules, wherein the control unit is capable of reducing the power consumption of the at least three modules in a power-saving mode and of adjusting the power consumption of at least three of the modules to a specified value only in specified time intervals in order to monitor specified segments of the received data stream in the specified time intervals, wherein the control unit is capable of adjusting the power consumption of all the modules to a specified value on detecting a specified identifier, wherein the cable modem comprises a voltage source and at least one switch, the voltage source being connected via the at least one switch to each module, and each switch being controlled by the control unit to enable the control unit to adjust the power consumption of all modules via said at least one switch.

2. A cable modem according to claim 1, characterized in that at least one of the three modules comprises an input and an output and also a switchable bypass circuit connecting the input and output, and in that the control unit connects the input of the at least one module to its output via the bypass circuit if the power consumption of the at least one module is reduced.

3. A cable modem according to claim 2, characterized in that the voltage source is remotely fed via the telecommunications network or via a separate power supply line independent of the telecommunications network and comprises a battery as an emergency power supply.

4. A cable modem according to claim 2, characterized in that the module comprising a switchable bypass circuit is an error correction decoder.

5. A cable modem according to claim 1, characterized in that the control unit is capable of automatically switching to the power-saving mode after completion of the transmission of the cable modem-specific data intended for the cable modem.

6. A cable modem according to claim 1, characterized in that the cable modem is designed as an MPEG-2 receiver.

7. A cable modem according to claim 1, characterized in that the control unit is designed as a processor or as a reprogrammable component.

8. A cable modem according to claim 1, characterized in that the cable modem includes a QAM demodulator module, filter module, decoder module, converter module, descrambler module, error correction decoder module, random generator module, and MPEG formatter module connected in series.

9. A cable modem according to claim 1, characterized in that power consumption can be controlled separately for each module using one switch for each module.

10. A cable modem according to claim 1, wherein said cable modem includes a synchronization circuit for maintaining synchronization with said network, wherein power is always supplied to said synchronization circuit even in said power saving mode when all of said nodules are switched off.

11. A telecommunications system, comprising:
   a transmitter for transmitting a data stream, wherein the data stream comprises cable modem-specific data;
   a telecommunications network; and
   a multiplicity of cable modems, wherein each cable modem comprises:
      at least three modules connected in series for recovering the cable-modem-specific data intended for the cable modem from the received data stream; and
      a control unit for controlling a power consumption of the at least three modules, wherein the control unit is capable of reducing the power consumption of the at least three modules in a power-saving mode and of adjusting the power consumption of at least three of the modules to a specified value only in specified time intervals in order to monitor specified segments of the received data stream in the specified time intervals, wherein the control unit is capable of adjusting the power consumption of all the modules to a specified value on detecting a specified identifier, wherein the cable modem comprises a voltage source and at least one switch, the voltage source being connected via the at least one switch to each module, and each switch being controlled by the control unit to enable the control unit to adjust the power consumption of all modules via said at least one switch.

12. A telecommunications system according to claim 11, characterized in that the data stream of the transmitter comprises data packets which each have a head section and a payload containing the cable modem-specific data, and in that the specified segments to be monitored are contained in data intended for the cable modem.

13. A telecommunications system according to claim 12, characterized in that each cable modem has a receiver-specific address, and in that the specified identifier for a specific cable modem comprises the cable modem-specific address of the respective cable modem and is transmitted in each case in the data intended for the cable modem in at least twelve consecutive data packets.

14. A telecommunications system according to claim 12, characterized in that the specified time intervals to be monitored by the cable modem in the power-saving mode each have at least the duration of a specified identifier.

15. A telecommunications system according to claim 12, characterized in that the cable modem-specific data comprise telephone signals.

16. A telecommunications system according to claim 11, characterized in that the telecommunications network is designed as at least on of a distribution network with a return channel and a hybrid fibre/coaxial-cable network.

17. A telecommunications system according to claim 11, characterized in that each transmitter comprises a scrambler which scrambles the data of a data packet, and in that, in each cable modem, a module comprises a descrambler which descrambles data of the data packet, and in that the control unit is capable of adjusting the power consumption of the descrambler in the specified time intervals to a specified value in the power-saving mode.

18. System (SYS) according to claim 11, characterized in that the receiver (EMP) is designed as cable modem or as set-top box.

* * * * *